United States Patent [19]

Stemmler

[11] Patent Number: 6,130,524
[45] Date of Patent: Oct. 10, 2000

[54] METHOD AND APPARATUS FOR GENERATING AND INJECTING REACTIVE POWER INTO AN ELECTRICAL AC POWER GRID SYSTEM USING AN INVERTER

[75] Inventor: Herbert Stemmler, Kirchdorf, Switzerland

[73] Assignee: Asea Brown Boveri AG, Baden, Switzerland

[21] Appl. No.: 09/126,956

[22] Filed: Jul. 31, 1998

[30] Foreign Application Priority Data

Jul. 31, 1997 [CH] Switzerland .................. 1836/97

[51] Int. Cl.$^7$ ...................................................... G05F 1/70
[52] U.S. Cl. .............................................. 323/207; 363/41
[58] Field of Search .................... 363/41, 65; 323/207; 307/105

[56] References Cited

U.S. PATENT DOCUMENTS

| 4,651,265 | 3/1987 | Stacey et al. . |
| 5,309,346 | 5/1994 | Gyugyi .................................... 363/54 |

FOREIGN PATENT DOCUMENTS

| 0489945A1 | 6/1992 | European Pat. Off. . |
| 94 16 048U1 | 3/1996 | Germany . |
| 934974 | 8/1963 | United Kingdom . |
| 2 242 792 | 10/1991 | United Kingdom . |
| 2242792A | 10/1991 | United Kingdom . |
| 2 294 821 | 5/1996 | United Kingdom . |
| WO93/09600 | 5/1993 | WIPO . |

OTHER PUBLICATIONS

"Neuer stromeinprägender Wechselrichter mit GTO–Löschung", Still, etzArchiv Bd. Dec. 9 (1987), pp. 309–313.

"Regelungstechnische Konzeption einer Blindleistungskompensationseinrichtung fur hohe dynamische Anforderungen", Nuss, etzArchiv Bd. Dec. 10 (1988), pp. 41–46.

"Serienschaltung von GTO–Thyristoren für Frequenzumrichter hoher Leistung", Steimer, et al., ABB Technik Dec. 5 (1996), pp. 14–20.

Primary Examiner—Shawn Riley
Attorney, Agent, or Firm—Burns, Doane, Swecker & Mathis, L.L.P.

[57] ABSTRACT

In the case of a method for feeding reactive power into an AC grid system, in the case of which method at least one line (10) of the grid system has a compensation voltage ($U_{comp}$) produced for it, which compensation voltage ($U_{comp}$) is phase-shifted with respect to the current in the line (10) and is injected into the line (10), simplified compensation is achieved in that the compensation voltage ($U_{comp}$) is produced from a DC voltage by means of an inverter (11), which is formed by gate turn-off power semiconductors in a bridge circuit, and in that the compensation voltage ($U_{comp}$) is injected in series directly into the line (10).

28 Claims, 10 Drawing Sheets

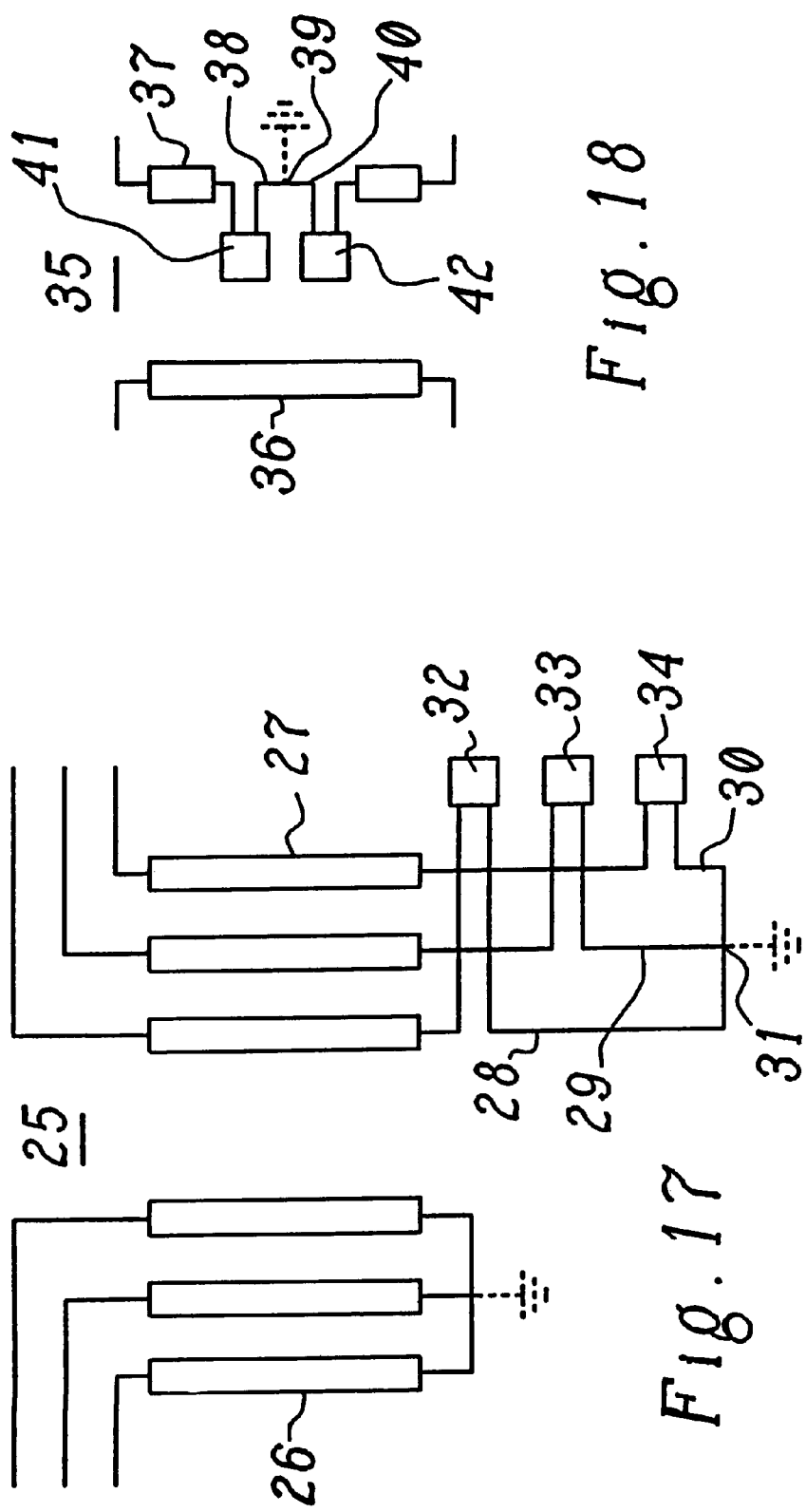

METHOD AND APPARATUS FOR GENERATING AND INJECTING REACTIVE POWER INTO AN ELECTRICAL AC POWER GRID SYSTEM USING AN INVERTER

BACKGROUND OF THE INVENTION

1. Field of the Invention

The present invention relates to the field of power electronics. It refers to a method for feeding reactive power into an AC grid system, in the case of which method at least one line of the grid system has a compensation voltage produced for it, which compensation voltage is phase-shifted with respect to the current in the line and is injected into the line. The invention furthermore relates to an inverter for use in such a method.

2. Discussion of Background

In electrical power transmission systems, the distribution of the power flows is determined, without any control measures, by the impedance relationships of the transmission lines which are interconnected in a grid. The electrically effective impedance of a transmission line can be varied by using series compensators to inject reactive power, via series voltage injection. This measurement changes the complex voltage difference between the connection points, and thus the power flow via the line. Series compensation can be used to deliberately increase or reduce the load on lines, and to utilize the overall transmission capacity more effectively. This is not limited to three-phase transmission systems. Use in single-phase AC systems is also feasible.

In existing system designs, it is in general possible to distinguish between thyristor-switched or thyristor-controlled series compensation and static synchronous compensation. Thyristor-controlled series compensation comprises a plurality of series-connected modules, which are installed in each phase of a three-phase transmission line. Owing to the thyristor technology that can be used, a parallel circuit comprising a capacitance and a controlled (thyristor-switched) inductance is required per module in this case. A component, which may be designed by way of example as a varistor, is also required to protect this parallel circuit against overloading. The disadvantage of this known system configuration is essentially that the semiconductor switches are mains-commutated in operation, which results in a very limited operating range.

Static synchronous compensators work electrically by injecting an additional voltage (compensation voltage) at right angles to the line current (phase shift of 90°). The injection of this additional voltage necessitates a transformer, which is connected in series with a transmission line that is to be compensated. The transformer that is required for injecting the additional voltage forms a comparatively high cost element in the overall costs of such a system.

SUMMARY OF THE INVENTION

Accordingly, one object of the invention is to provide a novel compensation method which involves considerably reduced circuit complexity and is nevertheless flexible in application.

In the case of a method of the type mentioned initially, the object is achieved in that the compensation voltage is produced from a DC voltage by means of an inverter, which is formed by gate turn-off power semiconductors in a bridge circuit, and in that the compensation voltage is injected in series directly into the line. The use of an inverter bridge fitted with semiconductors allows a largely sinusoidal compensation voltage to be produced, at any required predetermined phase angle, in a simple manner. It is possible to dispense with additional injection elements such as transformers and the like, by direct series injection into the line to be compensated.

A first preferred embodiment of the method as claimed in the invention is distinguished by the fact that at least one charged capacitor is used as the DC voltage source for the inverter. Since the compensation device essentially injects reactive power, the capacitor provides a simple and advantageous DC voltage source.

In a first preferred development of this embodiment, the at least one capacitor is charged via the inverter from the line of the AC grid system. This avoids additional voltage supply devices, and the compensation circuit becomes particularly simple.

A second preferred development of this embodiment is distinguished by the fact that the at least one capacitor is fed via a separate converter. This provision of the DC voltage in the manner of a DC intermediate circuit is advantageous if the compensation circuit is intended to inject not only pure reactive power but also real power into the line.

A further preferred embodiment of the method as claimed in the invention is distinguished by the fact that AC grid system is a 3-phase design, and that an associated inverter for producing and injecting a compensation voltage is connected in series in an associated line for each of the 3 phases. This allows the desired compensation to be carried out separately for each phase.

Another preferred embodiment is distinguished by the fact that the inverters each comprise two half-bridges and that the half-bridges are driven in a pulse-width-modulated manner on the basis of a sinusoidal modulation signal. The pulse-width modulation makes it possible for the output voltage produced by the inverter to approximate more closely to a sinusoidal waveform with little complexity, thus reducing the harmonic content. This is particularly the situation if, according to a preferred development of this embodiment, the inverters are designed as 2-point bridges, and the individual half-bridges are pulsed at different times by using appropriate carrier signals, or if the inverters are designed as N-point bridges (N≧3), and that the individual half-bridges are pulsed at different times by using appropriate carrier signals in such a manner that the resultant compensation voltage is obtained from superimposition of a plurality of pulse-width-modulated partial compensation voltages which are pulsed at different times.

A further reduction in the harmonic load can be achieved if, according to a further preferred embodiment of the method as claimed in the invention, a plurality of inverters for producing and injecting a compensation voltage are connected in series and/or parallel in a line of the AC grid system, the inverters are in each case driven in a pulse-width-modulated manner, and the pulse-width modulation in the individual inverters is carried out by pulsing at different times. At the same time, the series connection of a plurality of inverters results in an increased operating range in terms of the voltage, and the parallel connection results in an increased operating range in terms of the current.

A further reduction in the harmonics is obtained if, according to another embodiment, at least one filter circuit is arranged at the output of the inverters, which filter circuit comprises, in particular, an inductance connected in series with the inverter and at least one capacitor which is connected in parallel with the series circuit formed by the inverter and the at least one inductance. It is particularly simple if the AC grid system comprises a network transformer having parasitic inductances, and the parasitic inductance of the network transformer is used as part of the filter circuit.

The operating range of the compensation circuit can be expanded if, according to a further preferred embodiment of the invention, the inverters are each connected in series with at least one capacitor and/or one inductance.

It is particularly advantageous in terms of the requirements for insulation of the compensation system if, according to a preferred embodiment of the invention, the AC grid system has a network transformer with a neutral point at low potential, and the compensation voltage is injected at the neutral point.

If the AC grid system is a 3-phase grid system and if a 3-phase network transformer is provided within the grid system, which 3-phase network transformer has a star point as the neutral point, an appropriate compensation voltage is injected into each of the lines which lead to the star point. This can be done, on the one hand, by connecting in each case one inverter for producing and injecting a compensation voltage in series in each of the lines leading to the star point. On the other hand, this can alternatively be done by connecting the lines which lead to the star point to the outputs of a 3-phase inverter. In this case, the 3-phase inverter has the particular advantage that the capacitors on the DC side can be chosen to be smaller for the same compensation voltage, since there is no need to take into account a pulsating power in this case.

If the AC grid system is a single-phase system, and if a single-phase network transformer is provided within the grid system, which single-phase network transformer has, at least on one side, a zero-point circuit with a zero-point as the neutral point, an appropriate compensation voltage is injected into each of the lines leading to the zero point. This is done either by connecting an inverter for producing and injecting a compensation voltage in series in each of the lines leading to the zero point, or by connecting the lines that lead to the zero point to the outputs of a single-phase inverter.

The inverter according to the invention for the method is distinguished by the fact that the inverter is designed as an N-point bridge (N≧2).

An embodiment of the inverter according to the invention that is suitable for smaller voltages (for example a 13 kV grid system) is distinguished by the fact that only one power semiconductor is arranged per bridge arm in each of the half-bridges.

An embodiment of the inverter according to the invention that is suitable for higher voltages (for example a 400 kV grid system) is distinguished by the fact that a plurality of series-connected power semiconductors are arranged per bridge arm in each of the half-bridges.

In a particularly preferred development of this embodiment, hard-driven GTOs are used as the gate turn-off power semiconductors. Hard driving in this case means driving as has been described, for example, in the documents EP-A1-0 489 945 or WO-93/09600, or ABB Technik [ABB Engineering] 5 (1996), pages 14–20.

Further embodiments result from the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 17 shows a preferred compensation device according to the invention on the low-potential side (star point) of a 3-phase transformer;

FIG. 18 shows a preferred compensation device according to the invention on the low-potential side (at the zero point) of a single-phase network transformer;

DESCRIPTION OF THE PREFERRED EMBODIMENT

Figure 1:
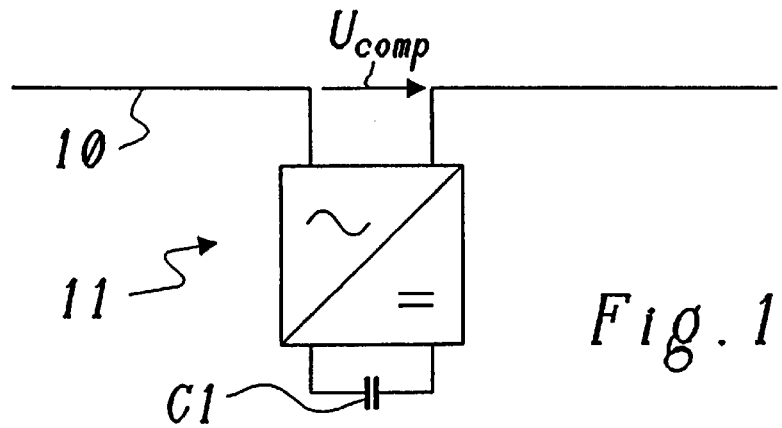
FIG. 1 shows the outline circuit diagram of a compensation circuit according to the invention, with an inverter connected in series with a line.
Figure 2:
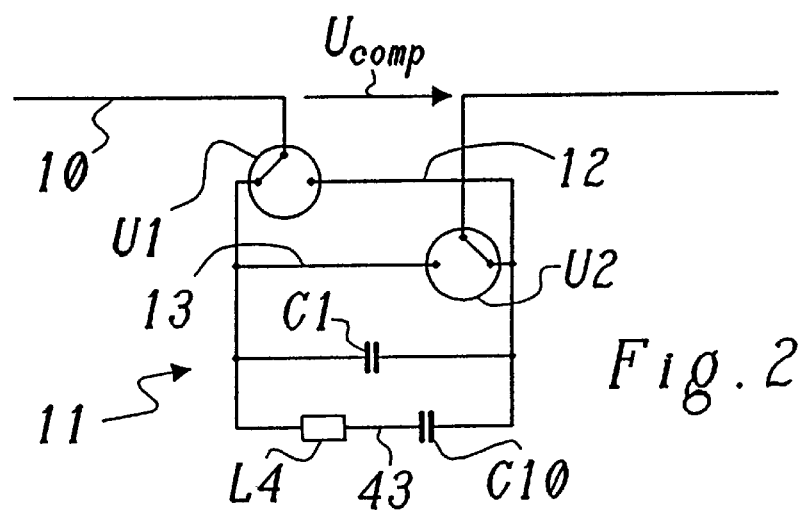
FIG. 2 shows the basic internal design of the inverter from FIG. 1 according to a first, preferred exemplary embodiment and in the form of a two-point bridge with changeover switches fitted with semiconductors and an additional tuned circuit on the DC side.

Referring now to the drawings, wherein like reference numerals designate identical or corresponding parts throughout the several views, FIG. 1 shows the outline circuit diagram of a compensation circuit according to the invention, in its simplest form. Within a single-phase or 3-phase AC grid system, a line 10 is chosen for compensation. The line 10 is separated, and an inverter 11 is connected directly in series with the line 10. An AC voltage is produced from a DC voltage (which originates from a capacitor C1) by means of the inverter 11, and is injected directly into the line 10, as the compensation voltage $U_{comp}$. According to FIG. 2, the inverter 11 contains a 2-point bridge circuit composed of two half-bridges 12 and 13, whose function can be characterized by a changeover switch U1 or U2, respectively. The outputs of the half-bridges 12, 13 in the inverter 11 are connected directly to the line 10. By suitably driving the changeover switches U1, U2, the capacitor voltage present across the capacitor C1 is selectively passed to the line 10 as a positive or negative voltage.

Figure 5:
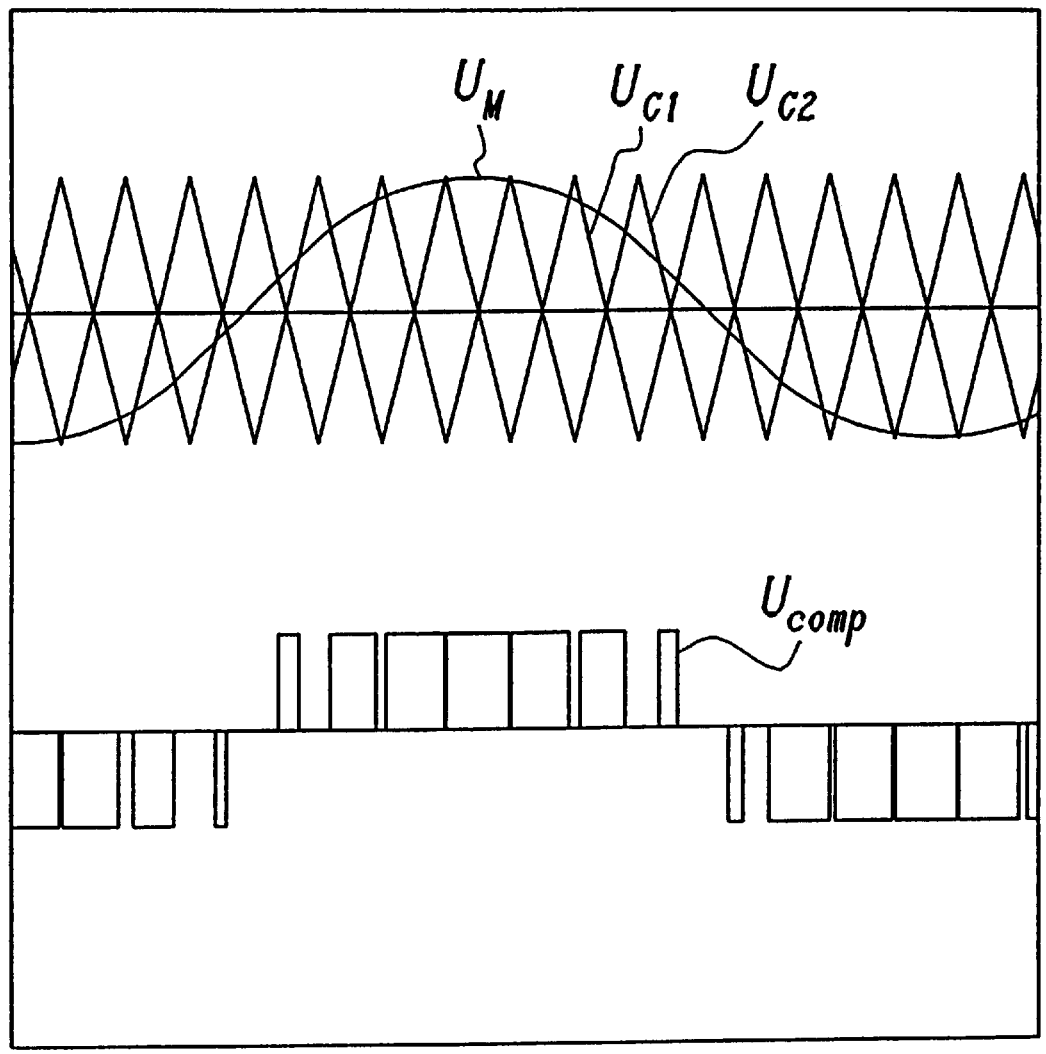
FIG. 5 shows an example of the waveforms of the voltages that occur when pulse-width modulation is used to drive the two-point bridge according to FIG. 2.

The compensation voltage $U_{comp}$ that is produced is ideally a sinusoidal AC voltage which either leads or lags the alternating current on the line 10 by 90°. To this end, the current and voltage on the line are measured, and the drive pulses for the changeover switches U1, 2 are derived from the measured signals in control electronics. This is preferably done according to FIG. 5 by producing a sinusoidal modulation signal $U_M$ at the desired phase angle and comparing this, in a manner known per se, with two triangular carrier signals $U_{C1}$, $U_{C2}$. The intersections of the signals are used to derive switching commands for the changeover switches U1,2, which lead to the pulse-width-modulated compensation voltage $U_{comp}$ illustrated at the bottom in FIG. 5. The method of operation of the inverter 11 leads to the capacitor C1 alternately taking power from the grid system and emitting power to the grid system, at twice the grid system frequency, the power level averaged over time in the process being zero. In order to damp these pulsations, the capacitor C1 may have connected in parallel with it a tuned circuit 43 which comprises a series circuit of an inductance L4 and a capacitor C10 and is tuned to twice the grid system frequency.

Figure 3:
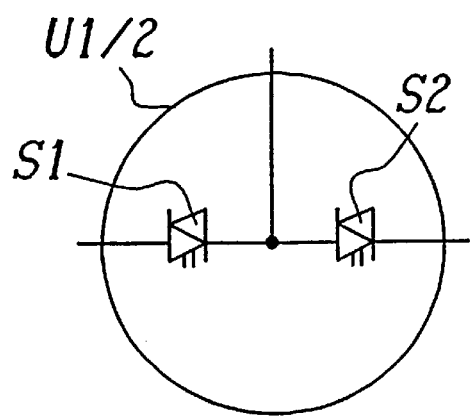
FIG. 3 shows an example of the internal design of a changeover switch according to FIG. 2 with one power semiconductor (reverse-conducting GTO) per bridge arm.
Figure 4:
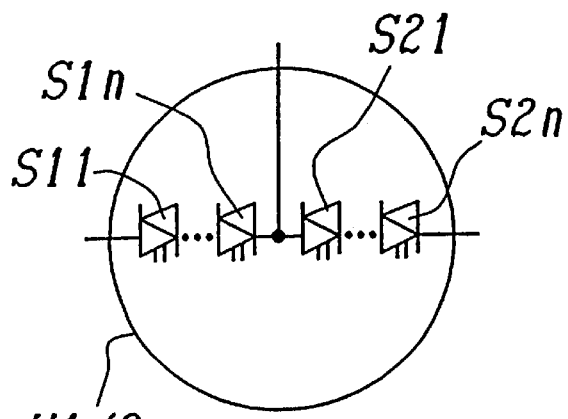
FIG. 4 shows an example of the internal design of a changeover switch according to FIG. 2 with a series circuit formed by a plurality of power semiconductors (reverse-conducting GTOs) per bridge arm.

The changeover switches U1,2 are implemented by gate turn-off power semiconductors in the manner illustrated in FIGS. 3 and 4. GTOs (Gate-Turn-Off thyristors), in particular reverse-conducting GTOs are used as proven power electronics components for the gate turn off power semiconductors. Alternatively, IGBTs (Insulated Gate Bipolar Transistors) or other gate turn-off components may be used. The voltage range of such power semiconductors is limited. At relatively low grid system voltages (for example 13 kV), individual power semiconductors S1 and S2 are used in the bridge arms according to FIG. 1. For high grid system voltages (for example 400 kV), series circuits formed by a large number of (n) power semiconductors S11, . . . , S1n and S21, . . . , S2n are used in the bridge arms according to FIG. 4. If GTOs are used in the series circuit, special precautions must be taken in order to ensure that the individual GTO elements switch simultaneously. "Hard" driving allows a plurality of series-connected GTOs to be driven exactly. With regard to the characteristic properties and the circuitry implementation of "hard" driving, reference should be made to the documents from the prior art, cited initially.

Figure 9:
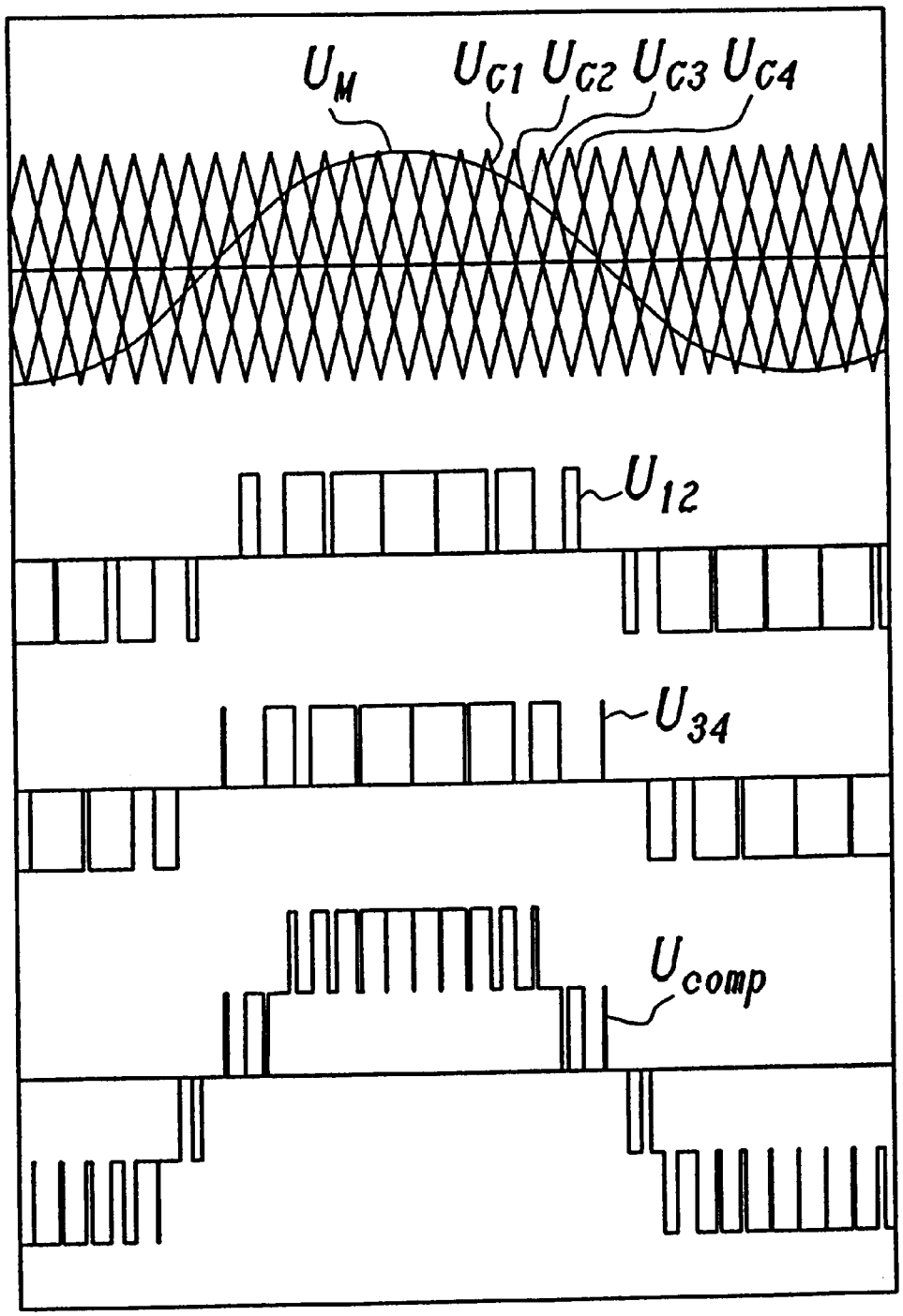
FIG. 9 shows an example of the design of the waveforms of the voltages which occur when pulse-width modulation is used to drive the 3-point bridge according to FIG. 6.

In addition to the already described 2-point bridge, a 3-point bridge or, even more generally an N-point bridge can also advantageously be used as an alternative for producing the compensation voltage $U_{comp}$. According to FIG. 6, the 3-point bridge comprises two changeover switches U3 and U4, each having 3 changeover points in two half-bridges 14 and 15, and which optionally connect the two ends or the center tap of a series circuit comprising two capacitors C2, C3 to the respective bridge output. In this way, two partial compensation voltages $U_{12}$ and $U_{34}$ are produced, which are added together at the output of the inverter 11 to form the compensation voltage $U_{comp}$. One advantage of the 3-point bridge is that two smaller capacitors can be used instead of one large capacitor to produce the same compensation voltage. The other advantage is that, if the pulse-width modulation that is preferably also used here is carried out with pulsing at different times, as is indicated in FIG. 9 by the phase-shifted carrier signals $U_{C1}$, . . . , $U_{C4}$, it is possible to reduce considerably the harmonic component of the compensation voltage $U_{comp}$, which is composed of the partial compensation voltages $U_{12}$ and $U_{34}$ (pulsed at different times). The N-point bridge results if, by analogy with the 3-point bridge, changeover switches with N changeover points are used in the half-bridges.

Figure 6:
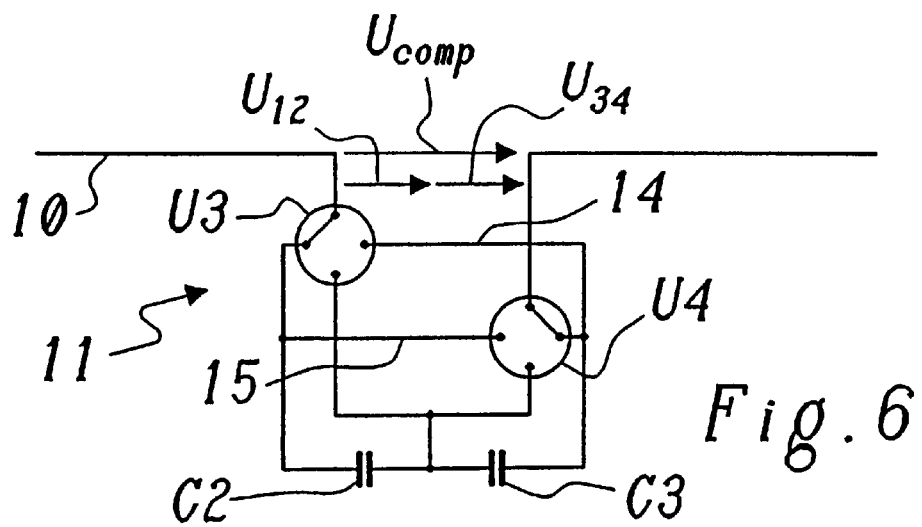
FIG. 6 shows the basic internal design of the inverter from FIG. 1 according to a second preferred exemplary embodiment, in the form of a 3-point bridge with changeover switches fitted with semiconductors.
Figure 7:
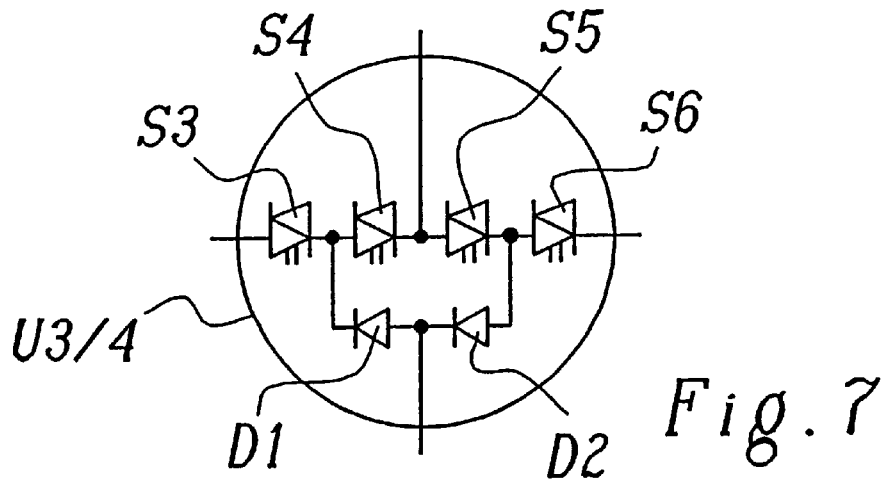
FIG. 7 shows an example of the internal design of a changeover switch according to FIG. 6 with one power semiconductor (reverse-conducting GTO) per bridge arm.
Figure 8:
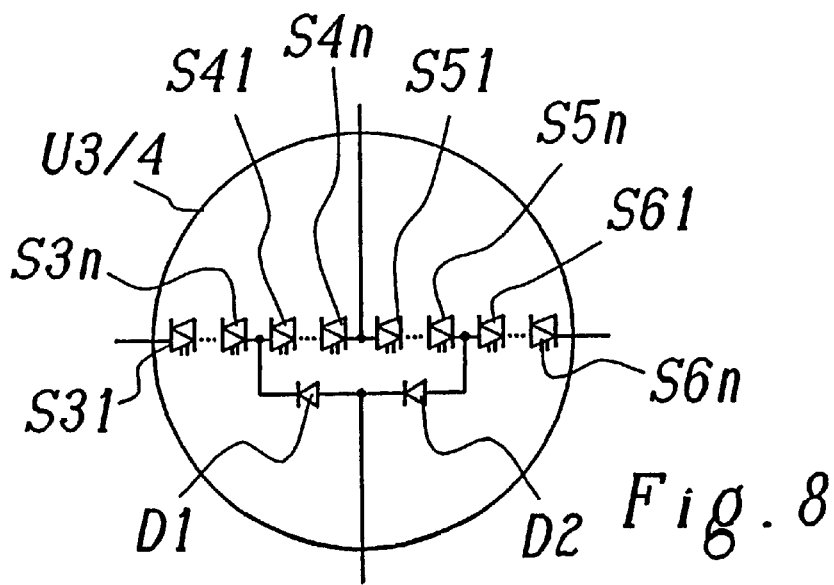
FIG. 8 shows an example of the internal design of a changeover switch according to FIG. 6, with a series circuit comprising a plurality of power semiconductors (reverse-conducting GTOs) per bridge arm.

The internal design of the changeover switches U3,4 from FIG. 6 preferably has the form illustrated in FIGS. 7 and 8. For relatively low grid system voltages, individual power semiconductors S3, . . . , S6 in the form of reverse-conducting GTOs and with corresponding diodes D1 and D2 are connected in the bridge arms according to FIG. 7. For high grid system voltages, series circuits composed of n power semiconductors S31, . . . , S3n to S61, . . . , S6n are in each case used instead of the individual power semiconductors and, in the case of GTOs, these are once again "hard" driven. Alternatively, other gate turn-off power semiconductors can also once again be used instead of the GTOs.

Figure 10:
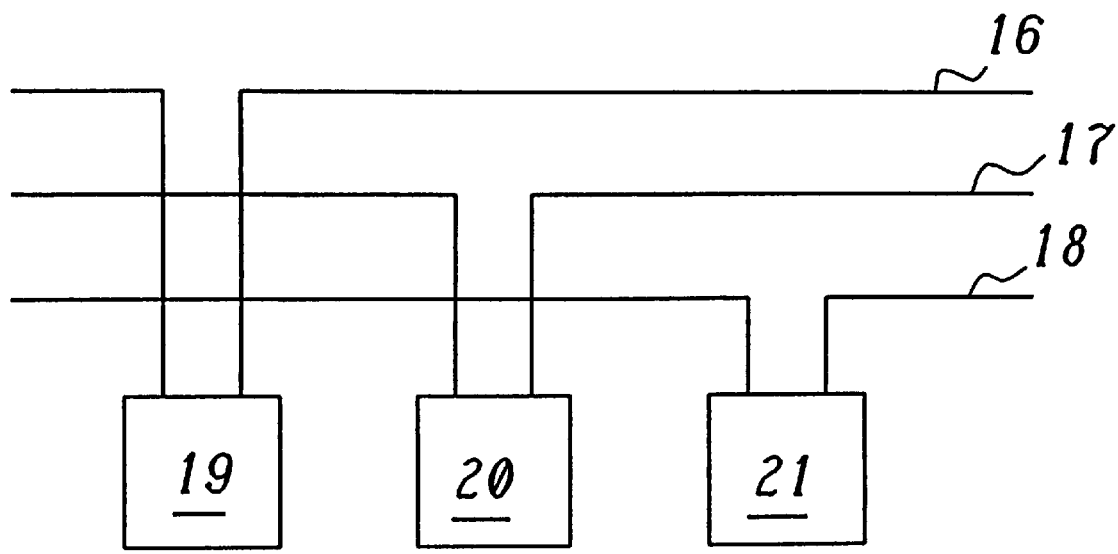
FIG. 10 shows the basic circuit of a 3-phase grid system with compensation according to the invention in all three phases.
Figure 11:
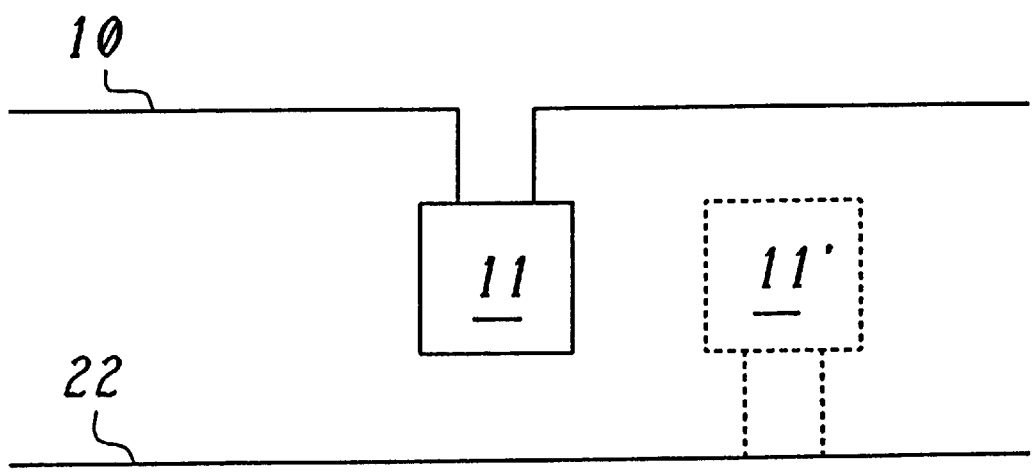
FIG. 11 shows the basic circuit of a single-phase AC grid system with compensation according to the invention.

In the explanations so far, the compensation has been considered and explained only with reference to one individual line 10. If the AC grid system is a 3-phase grid system, a line 16, 17 and 18 associated with each phase is preferably compensated according to FIG. 10, by connecting an associated inverter 19, 20 and 21 of the described type in series in this line. In the case of the single-phase grid system, an inverter 11 may be included, according to FIG. 11, in only one of the two lines 10, 22. Alternatively, it is feasible to connect an inverter 11, 11' into each of the two lines 10, 22.

Figure 12:
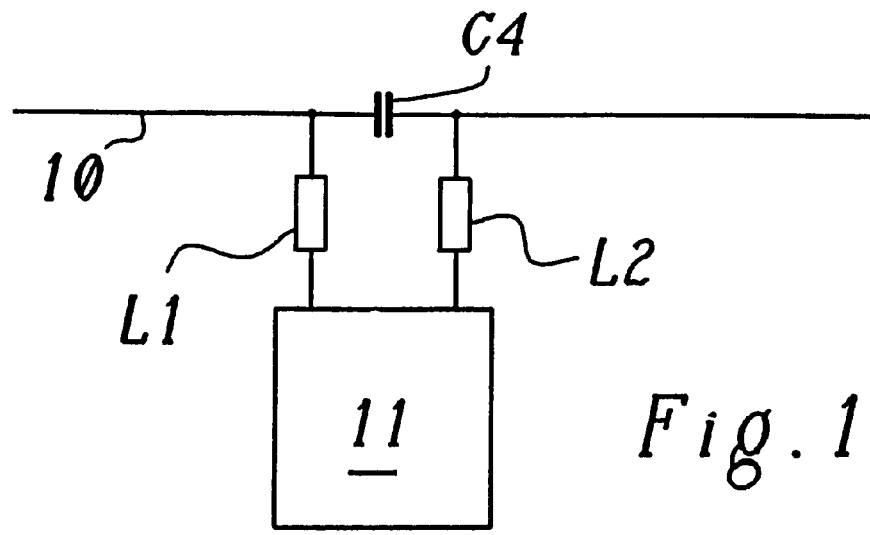
FIG. 12 shows an exemplary embodiment of a compensation circuit according to the invention having a filter circuit which is arranged at the output of the inverter and comprises two series inductances and a parallel-connected capacitor for filtering the harmonics.

As has already been mentioned above, suitable pulse-width-modulated driving of the bridge arms can be used in particular to achieve a reduced harmonic component in the compensation voltage $U_{comp}$, even in the case of the 3-point bridge. However, in addition, even further measures can be taken for reduction. One such measure comprises, for example, arranging a filter circuit at the output of the inverter 11 according to FIG. 12, which filter circuit comprises one or two series-connected inductances L1 and L2 and a parallel-connected capacitor C4, and which filters out or attenuates the harmonic components. The size of the capacitor C4 is in this case governed by the clock frequencies of the pulse-width modulation. If, in a 3-point bridge according to FIG. 6, four carrier signals $U_{C1}, \ldots, U_{C4}$ which are phase-shifted through 90° and whose frequency is F are used to produce the PWM drive signals, this results in the pulse frequency in the compensation voltage $U_{comp}$ being four times as high, 4F. The filter capacitor C4 is then on the one hand selected to be large enough to ensure that the voltage present across it retains a good sinusoidal wave form, and on the other hand small enough to draw only a small current at the fundamental frequency. Alternatively, the parasitic inductance L10 of an adjacent network transformer 46, which has parasitic inductances L10, L11, can advantageously be used as the inductance for a filter circuit according to FIG. 21.

Figure 13:
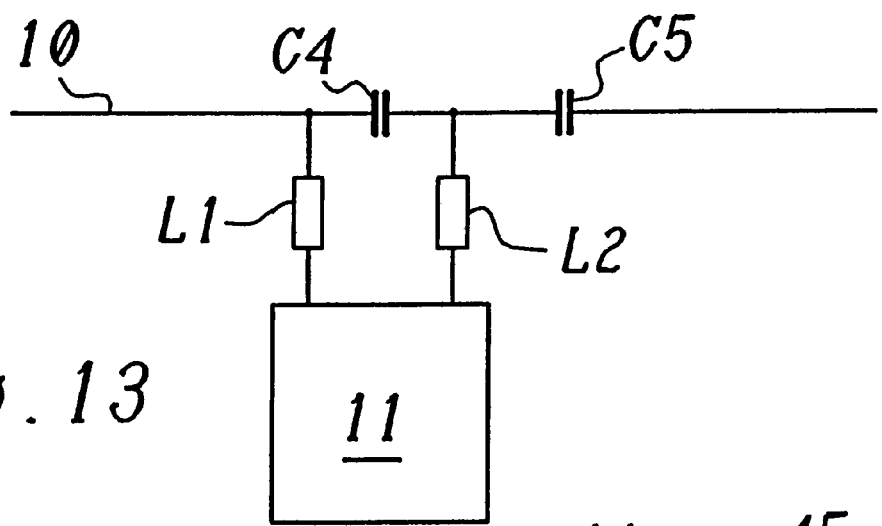
FIG. 13 shows an exemplary embodiment of a compensation circuit according to the invention as shown in FIG. 12 with an additional series-connected capacitor in order to expand the operating range.
Figure 14:
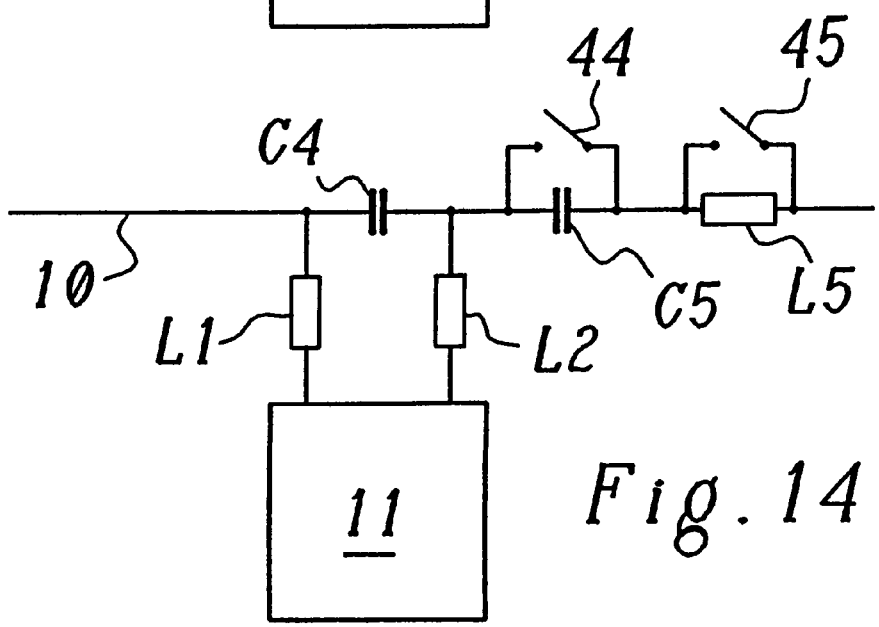
FIG. 14 shows an exemplary embodiment of a compensation circuit according to the invention as shown in FIG. 13 with an inductance additionally connected in series in order to expand the operating range, in which case it is optionally possible to replace the additional inductance or the additional capacitor by switches.
Figure 21:
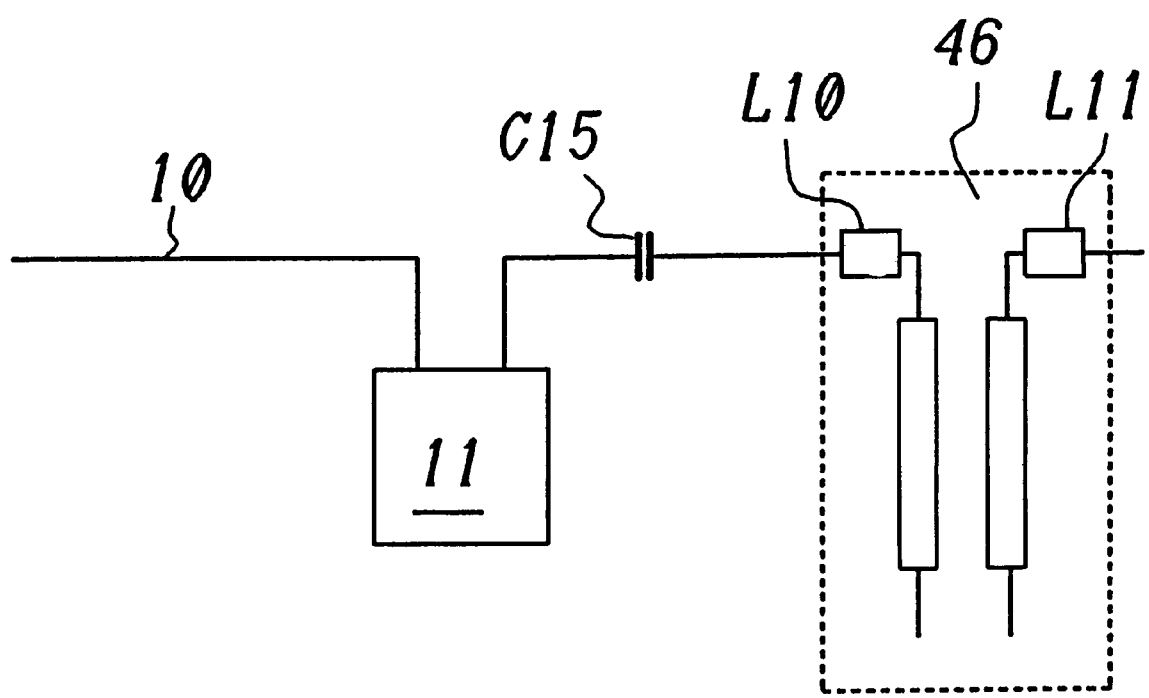
FIG. 21 shows the use of the parasitic inductance in a network transformer as the inductance for the inverter.

The operating range in which compensation is possible is essentially defined in the case of the inverter 11 by the amplitude of the compensation voltage $U_{comp}$ which, for its part, is essentially governed by the voltage across the capacitor C1 (for the 2-point bridge) or across the capacitors C2 and C3 (for the 3-point bridge). The operating range can be expanded (on the capacitor side) without changing the inverter 11 and without changing the switching elements by connecting a capacitor C5 in series with the output side of the inverter 11, as shown in FIG. 13. In order to expand the operating range (on the inductive side), an inductance (L5 in FIG. 14) can be connected in series instead of the capacitor. According to FIG. 14, the range expansion can be designed selectively and switchably by making it possible to bridge the series-connected capacitor C5 and inductance L5 by appropriate switches 44, 45. In the case of FIG. 21 as well, the operating range can be expanded by connecting an additional capacitor C15 in series.

Figure 15:
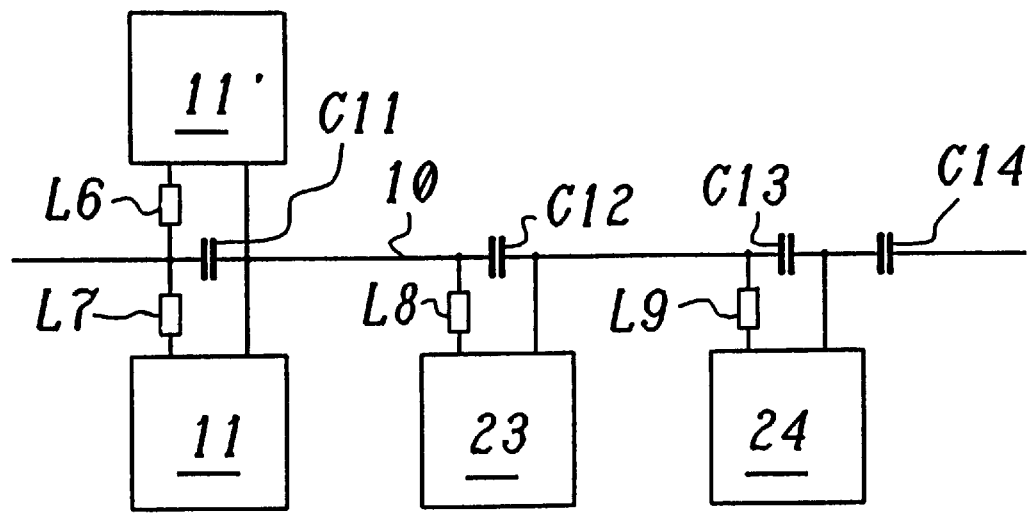
FIG. 15 shows the outline circuit diagram of a series and/or parallel circuit of a plurality of inverters (pulsed at different times) and local filter circuits for increasing the operating range and reducing the harmonic content.
Figure 16:
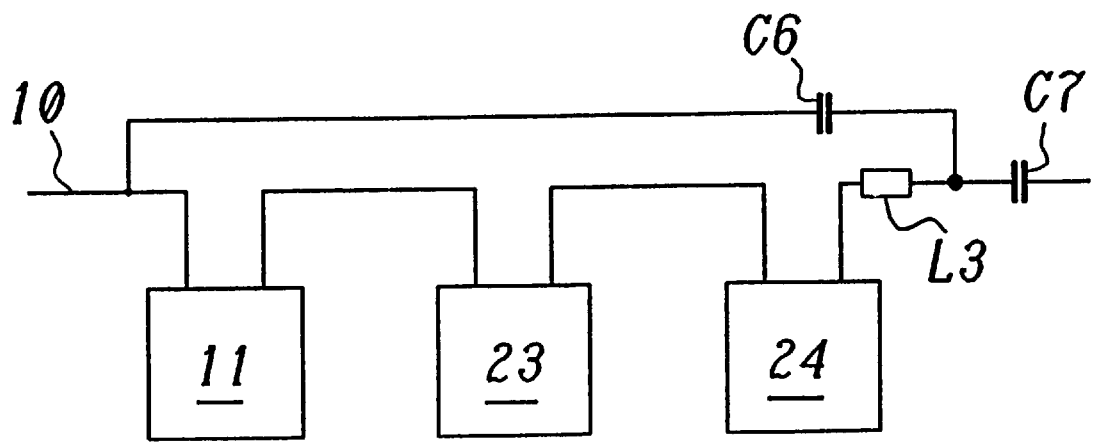
FIG. 16 shows a series circuit, corresponding to FIG. 15, with a concentrated filter circuit and additional inductance for expanding the operating range.

In addition to a change to the operating range of the inverter, which can be brought about by a change in the inverter or in its circuitry, the achievable level of compensation can also be increased by connecting a plurality of (identical) inverters 11, 23 and 24 in series or in parallel (inverters 11, 11') in a line 10 of the grid system, as shown in FIG. 15. The compensation voltages produced by the individual inverters then add together to form a resultant, higher compensation voltage. In the case of such a series circuit, it is particularly advantageous that it is possible to reduce the harmonic content even further by pulsing the individual inverters 11, 11', 23 and 24 at different times. The individual inverters 11, 11', 23, 24 in the series circuit can each be provided, per se, with a filter circuit composed of inductances L6, . . . , L9 and capacitors C11, . . . , C13. Once again, an additional capacitor C14 here expands the operating range. Another option, as shown in FIG. 16, is to equip the series circuit overall with additional circuitry composed of concentrated elements for the filter circuit (inductance L3 and capacitor C6). The function of the series capacitor C7 corresponds to that of the capacitor C14 in FIG. 15.

The series compensation without a transformer according to the invention results in particular advantages when used in conjunction with network transformers in the AC grid system, which have a low-potential side with a neutral point. If—as is shown in FIG. 17—the grid system is a three-phase grid system and the network transformer 25 is a three-phase transformer connected in star (primary 26, secondary 27), the compensation can be applied on the low-potential side, at the neutral point (star point 31) of the network transformer 25. To do this, compensating inverters 32, 33 and 34 are respectively connected in series with the lines 28, 29, 30 leading to the star point 31. Arranging the inverters on the low-potential side allows the level of insulation to be greatly reduced, which leads to simplification of the system, and reductions in its cost.

In the case of a single-phase grid system with a single-phase network transformer 35 (FIG. 18; primary 36, secondary 38) with a zero point as the neutral point, an equivalent arrangement of the compensation circuit at low potential is provided by connecting inverters 41, 42 in series with the lines 38, 40 leading to the zero point 39. Alternatively, it is feasible to use only one inverter (41 or 42) instead of the two inverters 41, 42.

Figure 19:
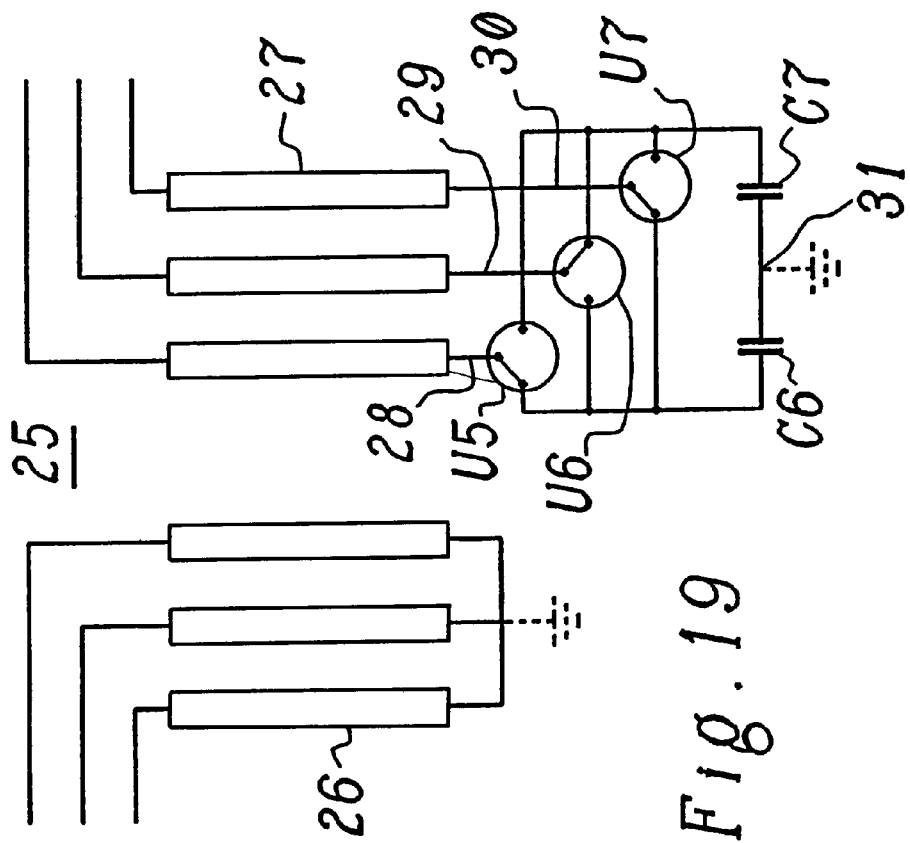
FIG. 19 shows a simplification of the arrangement according to FIG. 17, in which the various inverters are replaced by a 3-phase bridge.

The compensation arrangements according to FIGS. 17 and 18, which each comprise a plurality of inverters 32, . . . , 34 and 41, 42, respectively, can be simplified by skillfully combining the inverters in one bridge. The simplified arrangement resulting from FIG. 17 is shown in FIG. 19. In this case, the lines 28, 29 and 30 are connected to the outputs of a three-phase inverter, and these outputs are selectively connected via controlled changeover switches U5, U6 and U7 (as shown in FIGS. 3, 4) to the ends of a series circuit composed of two charged capacitors C6 and C7, the center tap between which is connected to the star point 31. Alternatively, it is feasible to combine the circuits from FIGS. 17 and 19 with one another, that is to say, in the case of the circuit from FIG. 19, in addition to connect individual inverters (like the inverters 32, 33 and 34 in FIG. 17) in series in the lines 28, 29 and 30, in order to increase the flexibility of the compensation circuit.

Figure 20:
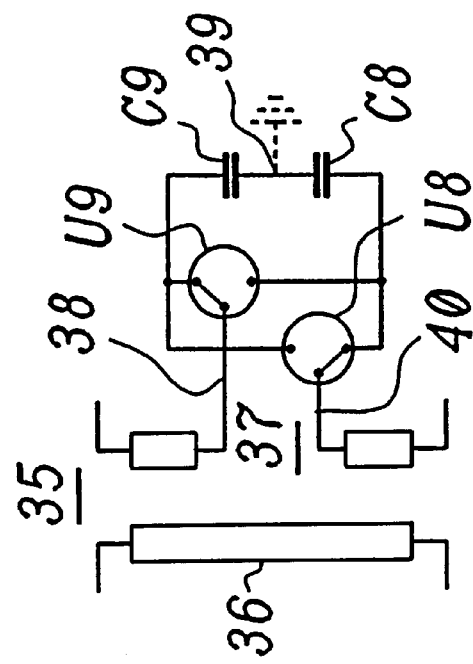
FIG. 20 shows a simplification of the arrangement according to FIG. 18, in which the various inverters are replaced by a single-phase bridge.

The analogous simplification for the arrangement according to FIG. 18 is shown in FIG. 20. In this case, the lines 38, 40 are selectively connected via changeover switches U8, U9 to the ends of a series circuit composed of charged capacitors C8 and C9, the center tap between which is connected to the zero point 39. In the cases illustrated in FIGS. 17 to 20, the neutral point (star point 31 or zero point 39) may be grounded (shown by dashed lines). However, such grounding is not absolutely essential.

If the compensation devices according to the invention emit pure reactive power, the capacitors C1, . . . , C3 and C6, . . . , C9 which provide the DC voltage for the inverter are advantageously charged directly from the grid system line, by suitably controlling the inverter. This avoids any additional links from other parts of the grid system to the capacitors. Alternatively, it may be desirable to feed real power into the line to be compensated, as well as the reactive power. In this case, it is feasible to charge or recharge, respectively, the capacitors C1, . . . , C3 and C6, . . . , C9, respectively, by means of a suitable (separate) DC supply (for example a converter).

Overall, the invention results in highly simplified compensation, which can be used in a very flexible manner, of reactive power for an AC grid system.

Obviously, numerous modifications and variations of the present invention are possible in light of the above teachings. It is therefore to be understood that, within the scope of the appended claims, the invention may be practiced otherwise than as specifically described herein.

| LIST OF DESIGNATIONS | |
|---|---|
| 10, 16, . . . , 18; 22 | Line |
| 11, 11' | Inverter |
| 12, . . . , 15 | Half-bridge |
| 19, . . . , 21 | Inverter |
| 23, 24 | Inverter |

-continued

LIST OF DESIGNATIONS

| | |
|---|---|
| 25, 35 | Network transformer |
| 26, 36 | Primary |
| 27, 37 | Secondary |
| 28, ..., 30 | Line |
| 31 | Star point |
| 38, 40 | Line |
| 39 | Zero point |
| 41, 42 | Inverter |
| 43 | Tuned circuit |
| 44, 45 | Switch |
| 46 | Network transformer |
| C1, ..., C15 | Capacitor |
| D1, 2 | Diode |
| L1, ..., L11 | Inductance |
| S1, ..., S6 | Power semiconductor (gate turn-off device) |
| S11, ..., S6n | Power semiconductor (gate turn-off device) |
| U1, ..., U9 | Changeover switch |
| $U_M$ | Modulation signal (sinusoidal) |
| $U_{C1}, ..., U_{C4}$ | Carrier signal (triangular) |
| $U_{12}, U_{34}$ | Partial compensation voltage |
| $U_{comp}$ | Compensation voltage |

What is claimed as new and desired to be secured by Letters Patent of the United States is:

1. A method for feeding reactive power into an AC grid system, in the case of which method at least one line of the grid system has a compensation voltage produced for it, which compensation voltage is phase-shifted with respect to the current in the line and is injected into the line, wherein the compensation voltage is produced from a DC voltage by at least one inverter, which is formed by gate turn-off power semiconductors in a bridge circuit, and wherein the compensation voltage is injected in series directly into the line and wherein the AC grid system has a network transformer with a neutral point which is at low potential, and wherein the compensation voltage is injected at the neutral point.

2. The method as claimed in claim 1, wherein at least one charged capacitor is used as the DC voltage source for the at least one inverter.

3. The method as claimed in claim 2, wherein the at least one capacitor is charged via the at least one inverter from the line of the AC grid system.

4. The method as claimed in claim 2, wherein the at least one capacitor is charged via a separate DC voltage supply.

5. The method as claimed in claim 1, wherein the AC grid system is a 3-phase design, and wherein an associated one of the at least one inverter for producing and injecting a compensation voltage is connected in series in an associated line for each of the three phases.

6. The method as claimed in claim 1, characterized in that each of the at least one inverter comprises two half bridges, and wherein the half-bridges are driven in a pulse-width-modulated manner on the basis of a sinusoidal modulation signal.

7. The method as claimed in claim 6, wherein the at least one inverter comprises a plurality of inverters which are designed as two-point bridges, and wherein the individual half-bridges are pulsed at different times by using appropriate carrier signals.

8. The method as claimed in claim 6, wherein the at least one inverter comprises a plurality of inverters which are designed as N-point bridges, and wherein the individual half-bridges are pulsed at different times by using appropriate carrier signals, in such a manner that the resultant compensation voltage is obtained by superimposing a plurality of pulse-width-modulated partial compensation voltages which are pulsed at different times.

9. The method as claimed in claim 1, wherein the at least one inverter comprises a plurality of inverters for producing and injecting a compensation voltage are connected in series and/or in parallel in at least one line of the AC grid system.

10. The method as claimed in claim 9, wherein the plurality of inverters are each driven in a pulse-width-modulated manner, and wherein the pulse-width-modulation in each of the plurality of inverters is carried out by pulsing at different times.

11. The method as claimed in claim 1, wherein a filter circuit is arranged at the output of the at least one inverter.

12. The method as claimed in claim 11, wherein the filter circuit comprises at least one inductance which is connected in series with the at least one inverter, and at least one capacitor which is connected in parallel with the series circuit formed by the at least one inverter and the at least one inductance.

13. The method as claimed in claim 11, wherein the AC grid system comprises a network transformer having parasitic inductances, and the parasitic inductance of the network transformer is used as part of the filter circuit.

14. The method as claimed in claim 1, wherein, in order to expand the operating range, each of the at least one inverter is respectively connected in series with at least one of a) at least one capacitor and b) at least one inductance.

15. The method as claimed in claim 1, wherein the AC grid system is a 3-phase grid system, and wherein a 3-phase network transformer is provided within the grid system, which 3-phase network transformer has as the neutral point a star point, and wherein an appropriate compensation voltage is injected into each of the lines which lead to the star point.

16. The method as claimed in claim 15, wherein at least one inverter for producing and injecting a compensation voltage is in each case connected in series in each of the lines which lead to the star point, and wherein the lines which lead to the star point are connected to the outputs of a 3-phase inverter.

17. The method as claimed in claim 16, and wherein the 3-phase inverter is designed as an N-point bridge.

18. The method as claimed in claim 1, wherein the AC grid system is a single-phase system, wherein a single-phase network transformer is provided within the grid system, which single-phase network transformer has, at least on one side, a zero-point circuit with a zero-point as the neutral point, and wherein an appropriate compensation voltage is injected into each of the lines which lead to the zero point.

19. The method as claimed in claim 18, wherein the at least one inverter for producing and injecting a compensation voltage is connected in series in each of the lines which lead to the zero point.

20. The method as claimed in claim 18, wherein the lines which lead to the zero point are connected to the outputs of a single-phase inverter.

21. The method as claimed in claim 2, wherein a tuned circuit is connected in parallel with the at least one capacitor.

22. The method as claimed in claim 1, wherein the at least one inverter is designed as an N-point bridge.

23. The method as claimed in claim 22, wherein only one power semiconductor is arranged per bridge arm in the at least one inverter.

24. The method as claimed in claim 22, wherein a plurality of series-connected power semiconductors are arranged per bridge arm in the at least one inverter.

25. The method as claimed in claim 23, wherein IGBTs (Insulated Gate Bipolar Transistors) are used as the gate turn-off power semiconductors.

26. The method as claimed in claim 23, wherein GTOs (Gate Turn Off thyristors) are used as the gate turn-off power semiconductors.

27. The method as claimed in claim 26, wherein a plurality of series-connected GTOs are arranged per bridge arm in the inverter, and wherein the series-connected GTOs are hard driven.

28. The method as claimed in claim 15, wherein the lines which lead to the star point are connected to the outputs of a 3-phase inverter.

* * * * *